(12) United States Patent
Nies et al.

(10) Patent No.: US 8,047,783 B2
(45) Date of Patent: Nov. 1, 2011

(54) SYSTEMS AND METHOD FOR OPERATING AN ACTIVE FLOW CONTROL SYSTEM

(75) Inventors: Jacob Johannes Nies, Zwolle (NL); Wouter Haans, Den Haag (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/613,170

(22) Filed: Nov. 5, 2009

(65) Prior Publication Data

US 2010/0135795 A1  Jun. 3, 2010

(51) Int. Cl.
*F03D 7/00* (2006.01)
*F03D 11/00* (2006.01)

(52) U.S. Cl. .......................... 416/1; 416/90 A; 416/90 R

(58) Field of Classification Search .................. 244/204, 244/207

See application file for complete search history.

(56) References Cited

U.S. PATENT DOCUMENTS

| | | | |
|---|---|---|---|
| 3,685,292 A | 8/1972 | Brown | |
| 4,692,095 A | 9/1987 | Lawson-Tancred | |
| 5,275,643 A | 1/1994 | Usui | |
| 5,938,404 A * | 8/1999 | Domzalski et al. | 416/91 |
| 6,629,674 B1 | 10/2003 | Saddoughi et al. | |
| 6,940,185 B2 * | 9/2005 | Andersen et al. | 290/44 |
| 6,972,498 B2 | 12/2005 | Jamieson et al. | |
| 7,354,247 B2 * | 4/2008 | Bonnet | 416/90 R |
| 7,363,808 B2 | 4/2008 | Ormel et al. | |
| 7,387,491 B2 * | 6/2008 | Saddoughi et al. | 416/62 |
| 7,420,289 B2 | 9/2008 | Wang et al. | |
| 7,435,057 B2 | 10/2008 | Parera | |
| 7,582,977 B1 | 9/2009 | Dehlsen | |
| 7,637,715 B2 | 12/2009 | Battisti | |
| 7,802,961 B2 | 9/2010 | Grabau | |
| 2001/0038798 A1 | 11/2001 | Foster | |
| 2005/0042102 A1 | 2/2005 | Teichert | |
| 2005/0242233 A1 | 11/2005 | Battisti | |
| 2007/0231151 A1 | 10/2007 | Herr et al. | |
| 2008/0181775 A1 | 7/2008 | Livingston et al. | |
| 2009/0140862 A1 | 6/2009 | Eggleston | |
| 2009/0304505 A1 | 12/2009 | Wobben | |

(Continued)

FOREIGN PATENT DOCUMENTS

DE   10 2006 032 387 A1   1/2008

(Continued)

OTHER PUBLICATIONS

David F. Fisher & Michael C. Fischer, Development Flight Tests of Jetstar LFC Leading-Edge Flight Test Experiment, (NASA, Langley Research Center ed., 1987).

(Continued)

*Primary Examiner* — Edward Look
*Assistant Examiner* — Ryan Ellis
(74) *Attorney, Agent, or Firm* — James McGinness, Esq.; Armstrong Teasdale LLP

(57) ABSTRACT

A method performed by a control system for operating a wind turbine includes operating a flow control system of the wind turbine in a first mode, and operating the flow control system in a second mode different than the first mode to facilitate removing debris from the flow control system. The second mode includes varying at least one of a velocity, a flow rate, and a direction of a fluid flow of the flow control system.

20 Claims, 5 Drawing Sheets

U.S. PATENT DOCUMENTS

| | | |
|---|---|---|
| 2009/0311097 A1 | 12/2009 | Pierce et al. |
| 2010/0076614 A1 | 3/2010 | Nies et al. |
| 2010/0135790 A1 | 6/2010 | Pal et al. |
| 2010/0135794 A1 | 6/2010 | Nies et al. |
| 2010/0135795 A1 | 6/2010 | Nies et al. |

FOREIGN PATENT DOCUMENTS

| | | |
|---|---|---|
| EP | 1517033 A1 | 3/2005 |
| GB | 2186033 A | 8/1987 |
| GB | 2466433 A1 | 6/2010 |
| WO | 2004092577 A1 | 10/2004 |
| WO | 2008080407 A1 | 7/2008 |

OTHER PUBLICATIONS

Gustave P. Corten & Herman F. Veldkamp, "Insects Can Halve Wind-Turbine Power," 412 Nature, 42-43 (2001).

Albert L Braslow, "A History of Suction-Type Laminar-Flow Control with Emphasis on Flight Research," Monographs in Aerospace History, No. 13, pp. 20, 21, 24 (1999).

Hal Romanowitz, "Alternate Energy Systems Engineering," available at www.oakcreekenergy.com/reports/flash/GCI-20020401.html (last visited Mar. 2, 2009).

* cited by examiner

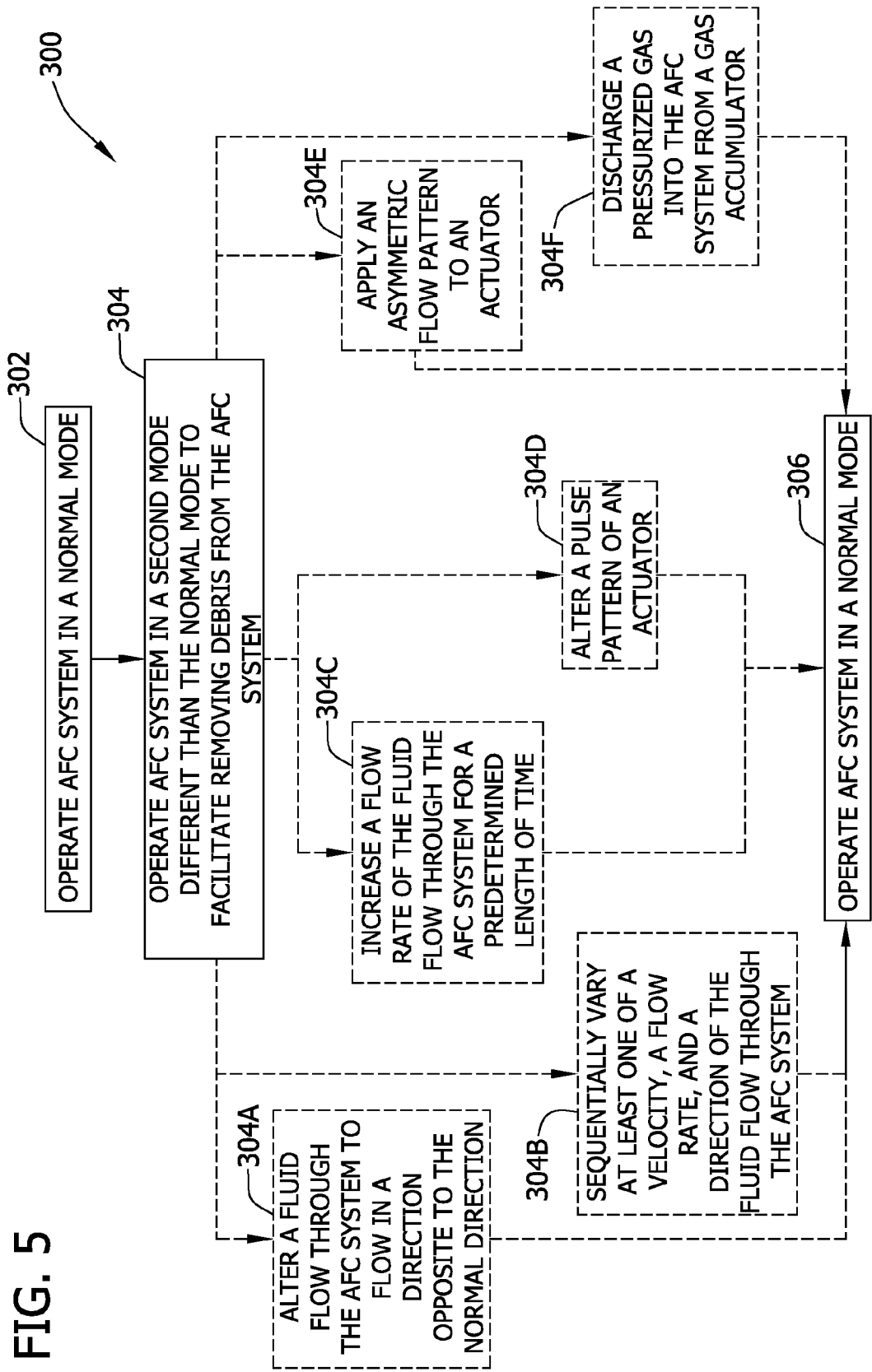

SYSTEMS AND METHOD FOR OPERATING AN ACTIVE FLOW CONTROL SYSTEM

CROSS REFERENCE TO RELATED APPLICATIONS

Cross-reference is hereby made to related, commonly assigned, co-pending applications: U.S. Ser. No. 12/613,079 entitled "Method for Operating a Wind Turbine with Reduced Blade Fouling" published on Jun. 10, 2010 as U.S. Pub. No. 2010/0143121, U.S. Ser. No. 12/613,157 entitled "Active Flow Control System for Wind Turbine" issued on Feb. 2, 2011 as U.S. Pat. No. 7,883,313, U.S. Ser. No. 12/613,287 entitled "Systems and Methods for Assembling an Air Distribution System for Use in a Rotor Blade of a Wind Turbine," U.S. Ser. No. 12/613,013 entitled "Systems and Method for Operating a Wind Turbine Having Active Flow Control" published on Jun. 3, 2010 as U.S. Pub. No. 2010/0135794, U.S. Ser. No. 12/613,268 entitled "Apparatus and Method for Cleaning an Active Flow Control (AFC) System of a Wind Turbine" published on Jun. 10, 2010 as U.S. Pub. No. 2010/0143123, and U.S. Ser. No. 12/613,274 entitled "Systems and Method for Operating a Wind Turbine Having Active Flow Control" published on Mar. 25, 2010 as U.S. Pub. No. 2010/0076614. Each cross-referenced application is invented by Jacob Johannes Nies and Wouter Haans and is filed on the same day as this application. Each cross-referenced application is hereby incorporated by reference in its entirety.

BACKGROUND OF THE INVENTION

The embodiments described herein relate generally to methods and systems for maintaining a wind turbine having an active flow control system and, more particularly, to methods and system for removing debris from the active flow control system and/or preventing an accumulation of debris within the active flow control system.

Active Flow Control (AFC) is a general term for technologies and/or systems that actively attempt to influence an aerodynamic response of an object in reaction to given in-flow conditions. More specifically, at least some known AFC systems are used to manipulate flow conditions across an airfoil. As used herein, the term "airfoil" refers to a turbine blade, a wing, and/or any other suitable airfoil. Although the embodiments described herein refer to a turbine blade, it should be understood that the embodiments described herein may be used with any suitable airfoil. In contrast to known passive flow control systems that provide substantially constant flow control, known AFC systems enable flow control to be selectively applied to an airfoil. At least some known AFC systems use air distribution systems to manipulate a boundary layer of air flowing across a surface of an airfoil. Known AFC systems include actuators that can be divided in two categories, depending on their net-mass-flow. The first category is zero-net-mass-flow actuators, such as synthetic jet actuators, and the second category is nonzero-net-mass-flow actuators, such as air ejection actuators, which may be steady or unsteady and/or blowing and/or suction actuators.

Because AFC systems are subjected to fluid flows that can contain debris, fouling of AFC perforations and/or apertures by debris is one of the obstacles for wide scale application of AFC on wind turbine blades, aircraft wings, and other airfoils. As used herein, the term "debris" refers to dirt, dust, insects, insect remains, particles, particulates, substances, suspended liquids and/or solids, and/or any other materials that may contact and accumulate in and/or on the wind turbine blades and/or other airfoils. Further, the terms "perforation" and "aperture" can be used interchangeably throughout this application.

In general, fouling of the AFC apertures by debris has an adverse effect on AFC system performance. Further, components, other than the perforations, of at least some known AFC systems are susceptible to fouling as well. For example, in at least some known nonzero-net-mass-flow systems, ambient air, possibly polluted with debris, is drawn into the AFC system to feed the actuators. Such polluted intake air may foul the air distribution system, the actuators, and/or the perforations of the AFC system.

Such fouling of the perforations and/or other components of known AFC systems may alter fluid flows across an airfoil such that the fluid flows deviate from clean-state fluid flows for which the blade is designed to yield. Additionally, fouling on blade surfaces and/or within AFC systems may reduce a power output of a system using airfoils and/or an AFC system, such as a wind turbine. However, manually cleaning each aperture of an AFC system is not practical because of a number of apertures in at least some known AFC systems and/or a duration of time that is required for the wind turbine to be offline for such manual cleaning.

Accordingly, it is desirable to provide a method and/or system for maintaining a wind turbine by cleaning an AFC system and/or preventing fouling of an AFC system. Further, such a method and/or system preferably does not include manual cleaning of the AFC system and/or the blade. Moreover, it is desirable for such method and/or system to use equipment available in a wind turbine having an AFC system.

BRIEF DESCRIPTION OF THE INVENTION

In one aspect, a method performed by a control system for operating a wind turbine is provided. The method includes operating a flow control system of the wind turbine in a first mode, and operating the flow control system in a second mode different than the first mode to facilitate removing debris from the flow control system. The second mode includes varying at least one of a velocity, a flow rate, and a direction of a fluid flow of the flow control system.

In another aspect, a flow control system for use with a wind turbine is provided. The flow control system includes an air distribution system at least partially defined within at least one blade of the wind turbine. The air distribution system includes at least one aperture defined through the blade. The flow control system further includes a control system in operational control communication with the air distribution system. The control system is configured to operate the flow control system in a first mode, and operate the flow control system in a second mode different than the first mode to facilitate removing debris from the flow control system. The second mode includes varying at least one of a velocity, a flow rate, and a direction of a fluid flow of the flow control system.

In yet another aspect, a wind turbine is provided. The wind turbine includes a rotor, at least one blade coupled to the rotor, wherein the blade has an outer surface, and an air distribution system at least partially defined within the blade. The air distribution system includes at least one aperture defined through the outer surface of the blade. The wind turbine further includes a control system in operational control communication with the air distribution system. The control system configured to operate the air distribution system of the wind turbine in a first mode, and operate the air distribution system in a second mode different than the first mode to facilitate removing debris from the air distribution system.

The second mode includes varying at least one of a velocity, a flow rate, and a direction of a fluid flow of the air distribution system.

The embodiments described herein facilitate removing debris from an active flow control system by operating the flow control system in a second mode different from a normal mode of operation. The second mode includes using equipment within the wind turbine to operate in a cleaning mode that is different from the normal mode. By varying the mode of operation during the second mode, existing equipment can unexpectedly be re-purposed for prevention and/or correction of fouling of the flow control system.

BRIEF DESCRIPTION OF THE DRAWINGS

FIGS. 1-5 show exemplary embodiments of the systems and methods described herein.

FIG. 1 is a perspective view of an exemplary wind turbine.

FIG. 2 is a schematic view of an exemplary flow control system that may be used with the wind turbine shown in FIG. 1.

FIG. 3 is a schematic view of an exemplary alternative flow control system that may be used with the wind turbine shown in FIG. 1.

FIG. 4 is an enlarged cross-sectional view of a portion of the flow control system shown in FIG. 3.

FIG. 5 is a flowchart of an exemplary method for operating a wind turbine that may include a flow control system shown in FIG. 2 or 3.

DETAILED DESCRIPTION OF THE INVENTION

The embodiments described herein provide a corrective/preventative solution to fouling of an active flow control (AFC) system by operating equipment within a wind turbine in a second mode different than a first or normal mode. During the second mode, available equipment within the wind turbine is operated differently than the equipment is operated in the normal mode. The second mode can additionally or alternatively include operating additional, permanently present maintenance equipment. By operating existing equipment within the wind turbine according to the second mode of operation, the systems and methods described herein provide a low-cost solution to fouling of an AFC system within the wind turbine, as compared to solutions to fouling that include additional equipment and/or systems.

Figure 1:
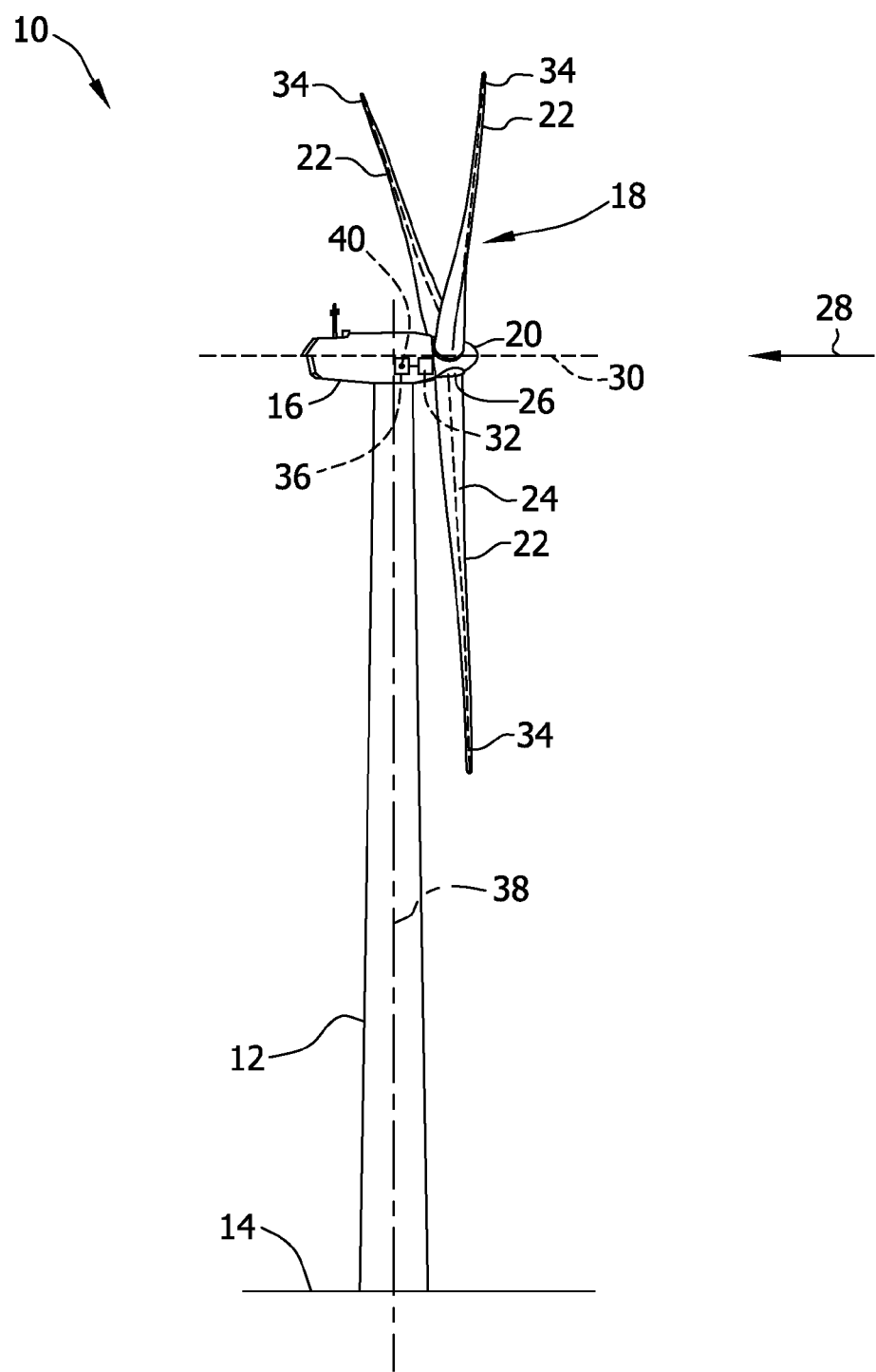

FIG. 1 is a perspective view of an exemplary wind turbine 10. In the exemplary embodiment, wind turbine 10 is a nearly horizontal-axis wind turbine. In another embodiment, wind turbine 10 may have any suitable tilt angle. Alternatively, wind turbine 10 may be a vertical axis wind turbine. In the exemplary embodiment, wind turbine 10 includes a tower 12 that extends from a supporting surface 14, a nacelle 16 mounted on tower 12, and a rotor 18 that is coupled to nacelle 16. Rotor 18 includes a rotatable hub 20 and at least one blade 22 coupled to and extending outward from hub 20. In one embodiment, blade 22 is integral with rotor 18. As used herein, the term "coupled" with reference to blade 22 and rotor 18 is intended to describe a blade 22 that is attached to rotor 18 and a blade 22 that formed integrally as one piece with rotor 18. In the exemplary embodiment, rotor 18 has three blades 22. In an alternative embodiment, rotor 18 includes more or less than three blades 22. In the exemplary embodiment, tower 12 is fabricated from tubular steel such that a cavity (not shown in FIG. 1) is defined between supporting surface 14 and nacelle 16. In an alternative embodiment, tower 12 is any suitable type of tower. A height of tower 12 is selected based upon factors and conditions known in the art.

Blades 22 are spaced about hub 20 to facilitate rotating rotor 18 to enable kinetic energy to be transferred from the wind into usable mechanical energy, and subsequently, electrical energy. Blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to blades 22 are transferred to hub 20 via load transfer regions 26.

In the exemplary embodiment, blades 22 have a length of between approximately 30 meters (m) (99 feet (ft)) and approximately 120 m (394 ft). Alternatively, blades 22 may have any length that enables wind turbine 10 to function as described herein. As wind strikes blades 22 from a direction 28, rotor 18 is rotated about an axis of rotation 30. As blades 22 are rotated and subjected to centrifugal forces, blades 22 are also subjected to various forces and moments. As such, blades 22 may deflect and/or rotate from a neutral, or non-deflected, position to a deflected position. Moreover, a pitch angle of blades 22, i.e., an angle that determines a perspective of blades 22 with respect to a rotor plane, may be changed by a pitch adjustment system 32 to control power, load, and/or noise generated by wind turbine 10 by adjusting an angular position of a profile of at least one blade 22 relative to wind vectors. Pitch axes 34 for blades 22 are illustrated. In the exemplary embodiment, a pitch of each blade 22 is controlled individually by a control system 36. Alternatively, the blade pitch for all blades may be controlled simultaneously by control system 36. Further, in the exemplary embodiment, as direction 28 changes, a yaw direction of nacelle 16 may be controlled about a yaw axis 38 to position blades 22 with respect to direction 28.

In the exemplary embodiment, control system 36 is shown as being centralized within nacelle 16, however control system 36 may be a distributed system throughout wind turbine 10, on supporting surface 14, within a wind farm, and/or at a remote control center. In a particular embodiment, a separate control system is included for an AFC system within wind turbine 1, such as flow control system 100 (shown in FIG. 2) and/or flow control system 200 (shown in FIG. 3). In the exemplary embodiment, control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels may include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a PLC cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, flow control system control commands. The execution of sequences of instructions is not limited to any specific combination of hardware circuitry and software instructions.

Figure 2:
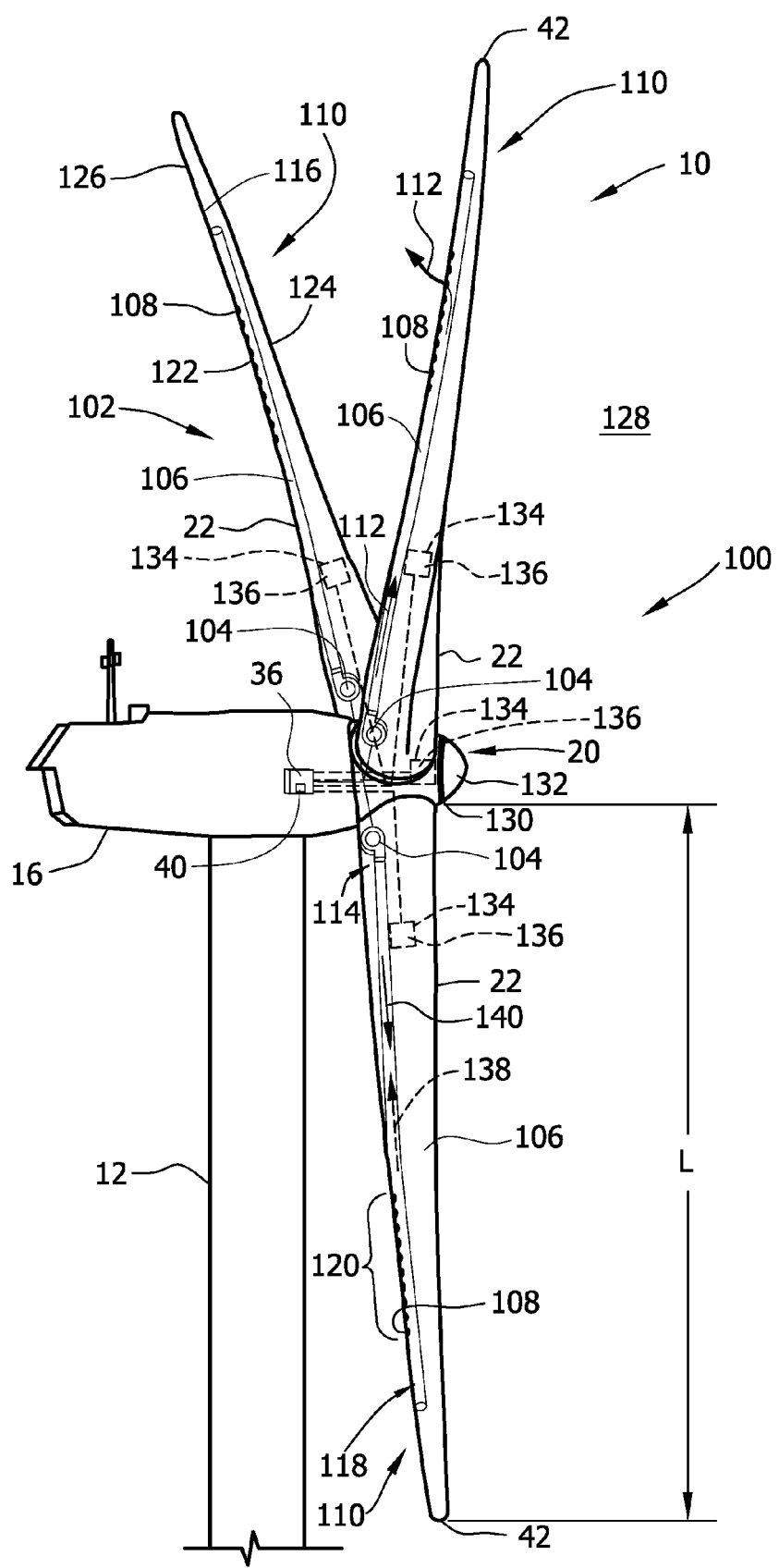

FIG. 2 is a schematic view of an exemplary flow control system 100 that may be used with wind turbine 10. Additional and/or alternative components are indicated by dashed lines. In the exemplary embodiment, flow control system 100 is a nonzero-net-mass flow control system that includes an air distribution system 102. Control system 36 considered to be a component of flow control system 100 and is in operational control communication with air distribution system 102. As used herein, "operational control communication" refers to a link, such as a conductor, a wire, and/or a data link, between two or more components of wind turbine 10 that enables signals, electric currents, and/or commands to be communicated between the two or more components. The link is configured to enable one component to control an operation of another component of wind turbine 10 using the communicated signals, electric currents, and/or commands.

Air distribution system 102 includes at least one flow control device 104, at least one manifold 106, and at least one aperture 108. At least one flow control device 104, a respective manifold 106, and one or more corresponding apertures 108 form an assembly 110. Each blade 22 includes an assembly 110 at least partially defined therein. As such, air distribution system 102 includes a plurality of flow control devices 104, a plurality of manifolds 106, and a plurality of apertures 108. Alternatively, at least one blade 22 includes an assembly 110. In the exemplary embodiment, each assembly 110 is substantially similar, however, at least one assembly 110 may be different than at least one other assembly 110. Further, although in the exemplary embodiment each assembly 110 includes a flow control device 104, at least two assemblies 110 may share a common flow control device 104.

Flow control device 104 is, for example, a pump, a compressor, a fan, a blower, and/or any other suitable device for controlling a flow of a fluid. In one embodiment, flow control device 104 and/or assembly 110 includes a valve (not shown) that is configured to regulate a flow within air distribution system 102, such as a flow rate and/or a flow direction. In the exemplary embodiment, flow control device 104 is reversible for changing a direction of a fluid flow 112. Further, in the exemplary embodiment, air distribution system 102 includes one flow control device 104 for each blade 22 of wind turbine 10, however, it should be understood that air distribution system 102 can include any suitable number of flow control devices 104. Control system 36 is in operational control communication with each flow control device 104 for controlling fluid flows through air distribution system 102. Control system 36 may be directly coupled in operational control communication with each flow control device 104 and/or may be coupled in operational control communication with each flow control device 104 via a communication hub and/or any other suitable communication device(s).

Each flow control device 104 is in flow communication with at least one manifold 106. When one centralized flow control device 104 is used, flow control device 104 is in flow communication with each manifold 106 of air distribution system 102. In the exemplary embodiment, a flow control device 104 is coupled within a respective blade 22 at a root end 114 of each manifold 106 and/or a root portion 24 of each blade 22. Alternatively, flow control device 104 may be in any suitable position within wind turbine 10 and/or on supporting surface 14 (shown in FIG. 1) with respect to at least one manifold 106.

In the exemplary embodiment, each manifold 106 is at least partially defined along an interior surface 116 within respective blade 22 and extends generally along a respective pitch axis 34 (shown in FIG. 1) from root end 114 of manifold 106 to a tip end 118 of manifold 106. It should be understood that tip end 118 is not necessarily positioned within a tip 42 of blade 22, but rather, is positioned nearer to tip 42 than manifold root end 114 is. In one embodiment, apertures 108 are defined at a predetermined portion 120 of a length L of blade 22 from root end 114 within tip end 118. Further, it should be understood that manifold 106 may have any suitable configuration, cross-sectional shape, length, and/or dimensions that enables air distribution system 102 and/or flow control system 100 to function as described herein. It should also be understood that one or more components of blade 22 can be used to form manifold 106.

In the exemplary embodiment, air distribution system 102 also includes at least one aperture 108 in flow communication with respective manifold 106. More specifically, in the exemplary embodiment, air distribution system 102 includes a plurality of apertures 108 defined along a suction side 122 of respective blade 22. Although apertures 108 are shown as being aligned in a line along suction side 122, it should be understood that apertures 108 may be positioned anywhere along suction side 122 of blade 22 that enables flow control system 100 to function as described herein. Alternatively or additionally, apertures 108 are defined through a pressure side 124 of blade 22. In the exemplary embodiment, aperture 108 is defined though an outer surface 126 of blade 22 for providing flow communication between manifold 106 and ambient air 128.

Flow control devices 104 are, in the exemplary embodiment, in flow communication with ambient air 128 via an opening 130 defined between hub 20 and a hub cover 132. Alternatively, wind turbine 10 does not include hub cover 132, and ambient air 128 is drawn into air distribution system 102 through an opening 130 near hub 20. In the exemplary embodiment, flow control devices 104 are configured to draw in ambient air 128 though opening 130 and to discharge fluid flow 112 generated from ambient air 128 into respective manifold 106. Alternatively, opening 130 may be defined at any suitable location within hub 20, nacelle 16, blade 22, tower 12, and/or auxiliary device (not shown) that enables air distribution system 102 to function as described herein. Further, air distribution system 102 may include more than one opening 130 for drawing air into air distribution system 102, such as including one opening 103 for each flow control device 104. In an alternative embodiment, a filter is included within opening 130 for filtering air 128 entering air distribution system 102. It should be understood that the filter referred to herein can filter particles from a fluid flow and/or separate liquid from the fluid flow.

Additionally or alternatively, flow control system 100 also includes at least one gas accumulator 134. Gas accumulator 134 can be defined within blade 22, hub 20, and/or at any suitable location within wind turbine 10. Gas accumulator 134 is configured to accumulate and store a pressurized gas 136. For example, gas accumulator 134 accumulates and stores pressurized air at a pressure that is greater than a pressure within manifold 106 when flow control system 100 is providing active flow control for wind turbine 10. Pressurized gas 136 may be at any suitable pressure based on wind turbine 10 and/or environmental conditions. In one embodiment, pressurized gas 136 is between about 0.5 bars over the atmospheric pressure (also referred to herein as "overpressure") and about 10 bars overpressure, when a normal operating pressure of wind turbine 10 is about 0.3 bars overpressure.

In the exemplary embodiment, gas accumulator 134 is in flow communication with at least one assembly 110 at any suitable position within assembly 110. For example, gas accumulator 134 is positioned to achieve maximum effect on fouling, such as in a positioned where the pressure wave is not immediately discharged from flow control system 100. In one embodiment, gas accumulator 134 is positioned to achieve the maximum effect by position gas accumulator 134 in a portion of air distribution system 102 where a pressure wave is moving upstream and downstream and receiving similar backpressure in each direction. In the exemplary embodiment, gas accumulator 134 is in flow communication with at least one manifold 106. Alternatively, gas accumulator 134 is in flow communication with at least one flow control device 104, a filter, and/or any other component of wind turbine 10 that may be fouled. In a particular embodiment, one gas accumulator 134 is in flow communication with each assembly 110 of air distribution system 102. In the exemplary embodiment, gas accumulator 134 is configured to discharge pressurized gas 136 into air distribution system 102 as instructed by control system 36.

It should be understood that flow control system 100 may include other suitable components for cleaning and/or maintaining components of wind turbine 10 depending on a configuration of wind turbine 10. For example, flow control system 100 can include a fluid distribution system configured to channel a fluid into air distribution system 102.

During a flow control operation, flow control system 100 is used to provide AFC for wind turbine 10. More specifically, control system 36 controls air distribution system 102 to draw in ambient air 128 and discharge a fluid flow 112 through at least one aperture 108. Operation of one assembly 110 will be described herein, however, it should be understood that in one embodiment each assembly 110 functions similarly. Further, assemblies 110 can be controlled to operate in substantial synchronicity and/or each assembly 110 may be controlled separately such that a fluid flow about each blade 22 may be manipulated separately. When assemblies 110 are controlled in synchronicity, flow control system 100 can be controlled by control system 36 to maintain a predetermined load spectrum, power level, and/or noise level. In the exemplary embodiment, control system 36 controls flow control device 104 to draw in ambient air 128 to generate fluid flow 112 having one or more predetermined parameters, such as a velocity, a mass flow rate, a pressure, a temperature, and/or any suitable flow parameter. Flow control device 104 channels fluid flow 112 through manifold 106 from root end 114 to tip end 118. It should be understood that any suitable control methods and/or components, such as pitching blade(s) 22, can alternatively or additionally be used to control a load spectrum, a power level, and/or a noise level of wind turbine 10.

As fluid flow 112 is channeled through manifold 106, fluid flow 112 is discharged from air distribution system 102 and flow control system 100 through apertures 108. Discharged fluid flow 112 facilitates manipulating at least a boundary layer of a fluid flow across outer surface 126 of blade 22. More specifically, discharging fluid flow 112 at suction side 122 of blade 22 increases the lift on blade 22, which increases the power generated by wind turbine 10. Alternatively, flow control device 104 may be operated to draw in ambient air 128 through apertures 108 into manifold 106 for discharge from nacelle 16, hub 20, and/or any other suitable location. As such, ambient air 128 is drawn in from the boundary layer to manipulate the boundary layer.

Figure 3:
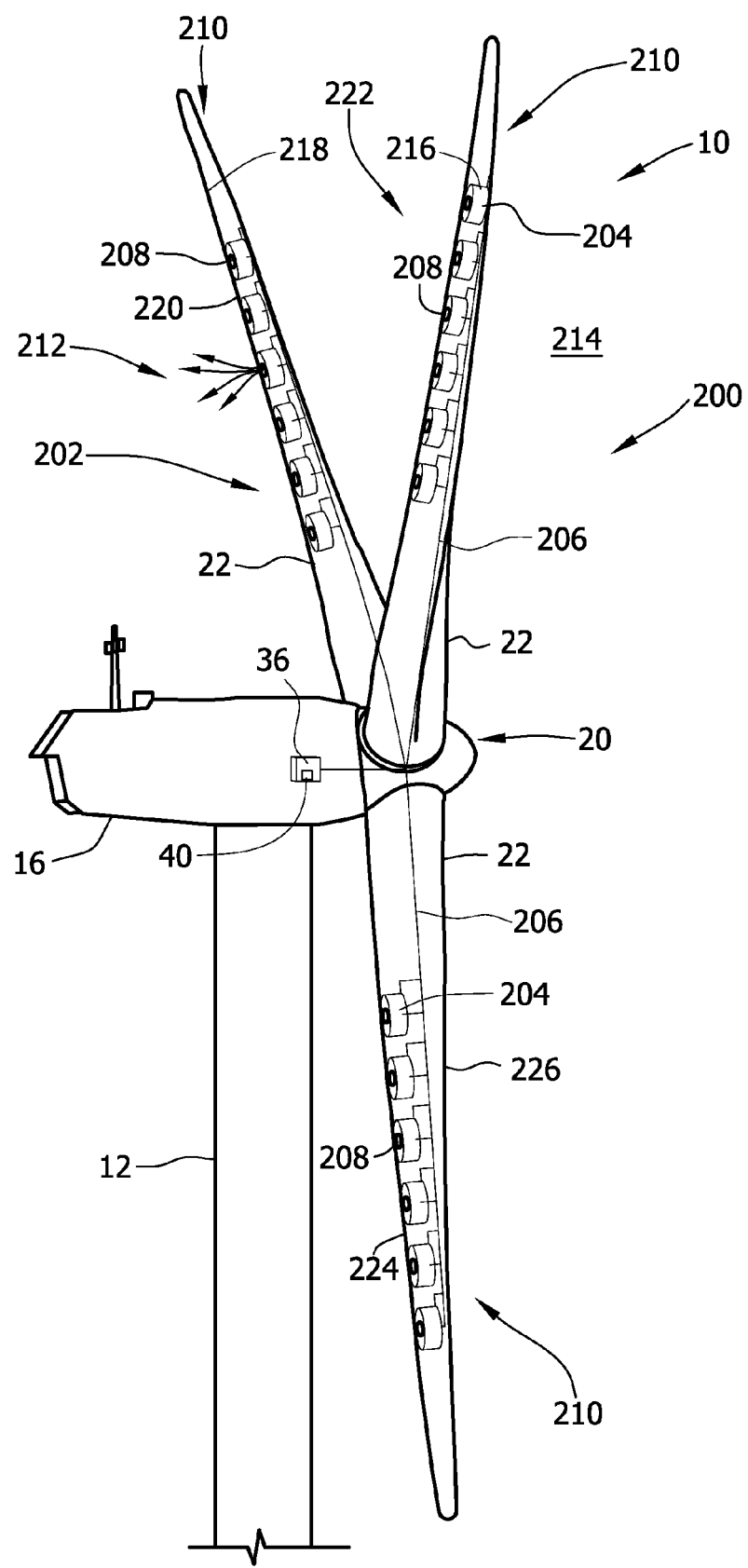
Figure 4:
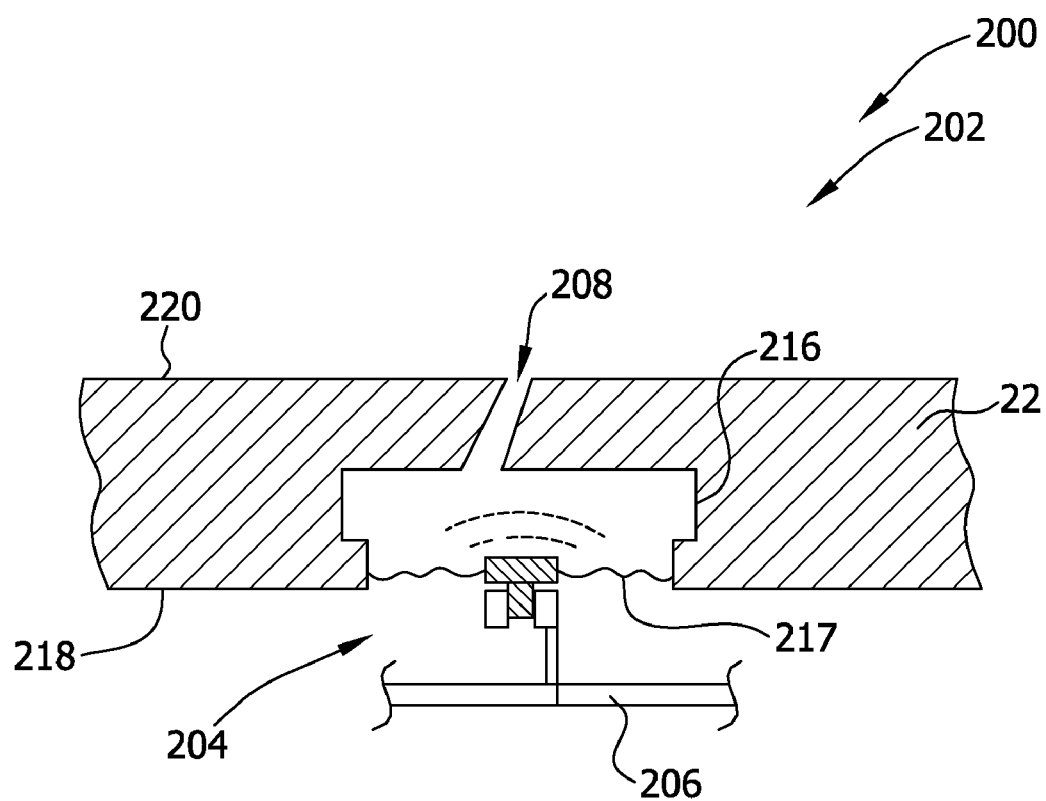

FIG. 3 is a schematic view of an exemplary alternative flow control system 200 that may be used with wind turbine 10. FIG. 4 is an enlarged cross-sectional view of a portion of flow control system 200. Components shown in FIG. 1 are labeled with similar reference numbers in FIGS. 3 and 4. In the exemplary embodiment, flow control system 200 is a zero-net-mass flow control system that includes an air distribution system 202. Control system 36 considered to be a component of flow control system 200 and is in operational control communication with air distribution system 202.

Air distribution system 202 includes at least one actuator 204, at least one communication link 206, and at least one aperture 208. Actuator 204, communication link 206, and apertures 208 define an assembly 210. In the exemplary embodiment, each blade 22 includes a respective assembly 210. As such, in the exemplary embodiment, air distribution system 202 includes a plurality of actuators 204, communication links 206, and apertures 208. Alternatively, air distribution system 202 includes one common communication link 206 for assemblies 210. In an alternative embodiment, at least one blade 22 includes an assembly 210 having communication link 206. In one embodiment, communication link 206 provides operational control communication between control system 36 and at least one actuator 204. In the exemplary embodiment, communication link 206 provides operational control communication between control system 36 and a plurality of actuators 204 within an assembly 210. Communications links 206 may be directly coupled in communication with control system 36 and/or in communication with control system 36 via a communications hub and/or any other suitable communication device. In on embodiment, actuator 204, communication link 206, and/or aperture 208 are at least partially defined in blade 22.

Actuator 204 is, in the exemplary embodiment, any known or contemplated actuator configured to form a synthetic jet 212 of fluid. As used herein, the term "synthetic jet" refers a jet of fluid that is created by cyclic movement of a diaphragm and/or piston 217, where the jet flow is synthesized from the ambient fluid. Synthetic jet 212 may be considered a fluid flow through flow control system 200. In one embodiment, actuator 204 includes a housing 216 and a diaphragm and/or a piston 217 within housing 216. Diaphragm and/or piston 217 can be mechanically, piezoelectrically, pneumatically, magnetically, and/or otherwise controlled to form synthetic jet 212. In the exemplary embodiment, actuator 204 is coupled to an interior surface 218 of blade 22 and is aligned with aperture 208 such that synthetic jet 212 and/or ambient air 214 flows through aperture 208.

Aperture 208 is defined within blade 22, and, more specifically, through an outer surface 220 of blade 22. Further, in the exemplary embodiment, at least one assembly 210 of air distribution system 202 includes a plurality of actuators 204 and a plurality of apertures 208. As such, air distribution system 202 includes an array 222 of apertures 208 defined through blade 22. In the exemplary embodiment, apertures 208 are defined along a suction side 224 of each blade 22. Although apertures 208 and/or actuators 204 are shown as being aligned in a line along suction sides 224, it should be understood that apertures 208 and/or actuators 204 may be positioned anywhere along suction side 224 of blade 22 that enables flow control system 200 to function as described herein. Additionally or alternatively, apertures 208 are defined through a pressure side 226 of blade 22, and/or actuators 204 are coupled to interior surface 218 of any suitable side of blade 22. In the exemplary embodiment, aperture 208 is configured to provide flow communication between a respective actuator housing 216 and ambient air 214.

It should be understood that flow control system 200 may include other suitable components for cleaning and/or maintaining components of wind turbine 10 depending on a configuration of wind turbine 10. For example, flow control system 200 can include a fluid distribution system configured to channel a fluid into air distribution system 202.

During a flow control operation, flow control system 200 is used to provide AFC for wind turbine 10. More specifically, control system 36 controls air distribution system 202 to draw in ambient air 214 and generate synthetic jet 212 through at least one aperture 208. Operation of one assembly 210 will be described herein, however, it should be understood that each assembly 210 functions similarly. Further, assemblies 210 can be controlled to operate in substantial synchronicity and/or each assembly 210 may be controlled separately such that a fluid flow about each blade 22 may be manipulated separately. When assemblies 210 are controlled in synchronicity, flow control system 200 can be controlled by control system 36 to maintain a predetermined load spectrum, power level, and/or noise level. In the exemplary embodiment, control system 36 instructs actuator 204 to alternately draw ambient air 214 into housing 216 (also referred to herein as a "breath-in stroke") and discharge synthetic jet 212 (also referred to herein as a "breath-out stroke") from housing 216 using diaphragm and/or piston 217 to generate synthetic jet 212 having one or more predetermined parameters, such as a velocity, a mass flow rate, a pressure, a temperature, and/or any suitable flow parameter. Synthetic jets 212 facilitate manipulating at least a boundary layer of a fluid flow across outer surface 220 of blade 22. More specifically, discharging synthetic jets 212 at suction side 224 of blade 22 increases the lift on blade 22, which increases the power generated by wind turbine 10. It should be understood that any suitable control methods and/or components, such as pitching blade(s) 22, can alternatively or additionally be used to control a load spectrum, a power level, and/or a noise level of wind turbine 10.

FIG. 5 is a flowchart of a method 300 for operating wind turbine 10 (shown in FIG. 1). By performing method 300, fouling of blade 22 (shown in FIG. 1) and/or flow control system 100 (shown in FIG. 2) and/or flow control system 200 (shown in FIG. 3) is facilitated to be corrected and/or prevented. Method 300 is performed by control system 36 (shown in FIG. 1) sending commands and/or instructions to components of wind turbine 10, such as air distribution system 102 and/or 202 (shown in FIGS. 2 and 3), gas accumulator 134 (shown in FIG. 2), and/or any suitable component. Processor 40 (shown in FIG. 1) within control system 36 is programmed with code segments configured to perform method 300. Alternatively, method 300 is encoded on a computer-readable medium that is readable by control system 36. In such an embodiment, control system 36 and/or processor 40 is configured to read computer-readable medium for performing method 300.

In the exemplary embodiment, method 300 is performed periodically according to a predetermined corrective schedule, a predetermined preventative schedule, condition-triggered automated operation, and/or condition-triggered manual operation. In a particular embodiment, control system 36 performs method 300 after control system 36 and/or a human operator determines optimal conditions exist, such as a low power-generating time period, a low wind speed time period, a high wind speed time period, and/or any optimal time period, for performing method 300. Alternatively, or additionally, control system 36 is configured to determine when fouling has occurred and/or will occur and perform method 300 upon making such a determination.

Referring to FIGS. 1, 2, and 5, in one embodiment when nonzero-net-mass flow control system 100 is used within wind turbine 10, method 300 includes operating 302 flow control system 100 in a first or normal mode. As used with respect to flow control system 100, the term "normal mode" refers to a mode of operating wind turbine 10, flow control system 100, and/or air distribution system 102 such that flow control system 100 and/or air distribution system 102 drives a flow 112 of fluid to increase lift on blade 22. The normal mode includes normal operation over a substantially entire power curve; operating when a wind speed is too low to generate power but wind turbine 10 is prepared to generate power; using constant and variable speed-ranges; operating within a peak shaver range; operating in an above rated condition; and/or performing a storm cut out. Flow characteristics of fluid flow 112 during the normal mode are determined empirically and/or are predetermined to achieve optimal lift on blade 22 depending on ambient conditions, such as a wind speed and/or a wind direction, precipitation, and/or other atmospheric and/or environmental conditions. At least one flow characteristic of fluid flow 112 may be adjusted and/or varied during the normal mode, based on changing ambient conditions and/or operating characteristics of wind turbine 10, to facilitate achieving optimal blade lift.

Flow control system 100 and/or air distribution system 102 is operated 302 in the normal mode according to a predetermined schedule and/or based on wind conditions. For example, when wind speeds are high, operation 302 of flow control system 100 is substantially terminated because increased lift on blade 22 is not desired in such wind conditions. However, even when active flow control is terminated, enough fluid is discharged from aperture 108 to facilitate preventing insects and/or other debris from flying into air distribution system 102. Such termination of active flow control is considered to be part of the normal operating mode.

Further, flow control system 100 and/or air distribution system 102 is operated 302 in the normal mode until it is determined that flow control system 100 and/or 200 and/or air distribution system 102 is fouled or may become fouled. In one embodiment, control system 36 determines an extent and/or a possibility of fouling of flow control system 100 and/or air distribution system 102. Alternatively, an operator of wind turbine 10 determines the extent and/or the possibility of fouling of flow control system 100 and/or air distribution system 102. In the exemplary embodiment, when flow control system 100 and/or air distribution system 102 is fouled, or may become fouled, maintenance is performed on wind turbine 10 to facilitate reducing fouling of flow control system 100 and/or air distribution system 102.

More specifically, method 300 includes operating 304 flow control system 100 and/or air distribution system 102 in a second mode different than the normal mode for a time period and/or until fouling has been rectified to facilitate removing debris from flow control system 100 and/or air distribution system 102. As used herein with respect to flow control system 100, the term "second mode" refers to a mode of operating wind turbine 10, flow control system 100, and/or air distribution system 102 to achieve an outcome in addition to or different than optimal lift on blade 22. As used herein, the term "optimal lift" refers to lift that maximizes power production and reduces the cost of power production, such as a lift that is optimized to account for initial costs of wind turbine 10 and/or a lift that produces a maximized ratio of annual energy capture over initial cost; however, any suitable optimization scheme can be used to achieve optimal lift. It should be understood that wind turbine 10 can be operated in more than two modes. For example, wind turbine 10 can further be operated in an ordinary operation mode, a full flow capacity mode, a non-zero flow mode, and/or a cleaning mode.

In the exemplary embodiment, the second mode is a mode that is intentionally beneficial for performing a cleaning operation rather than performing an operation target, such as capturing energy. During the second mode, control system 36 controls flow control system 100 and/or air distribution system 102 to facilitate removing debris from flow control system 100 and/or air distribution system 102. The second mode includes at least one cleaning mode to facilitate removing debris from flow control system 100 and/or air distribution system 102.

In the exemplary embodiment, the time period for the second mode is determined according to a preventative maintenance schedule, a corrective maintenance schedule, a determination of an extent of fouling, a determination of a possibility of fouling, a manual trigger by an operator, and/or a determination of optimal conditions for performing a cleaning mode. In a particular embodiment, control system 36 is configured to determine that ambient and/or operational conditions, such as a low wind speed, a high wind speed, a time of day, a time of year, and/or any other suitable condition, are optimal to operate 304 flow control system 100 and/or air distribution system 102 in the second mode, for example, during a low-power generation time period. One or more cleaning modes described in more detail below may be used during the second mode.

In the exemplary embodiment, after operating 304 in the second mode, method 300 includes operating 306 flow control system 100 and/or air distribution system 102 in the normal mode. More specifically, after the maintenance, cleaning, and/or preventative process of the second mode is completed, control system 36 controls wind turbine 10, flow control system 100, and/or air distribution system 102 to operate 306 in the normal mode, as described above.

Referring to FIGS. 1 and 3-5, in an alternative embodiment when nonzero-net-mass flow control system 100 is used within wind turbine 10, method 300 includes operating 302 flow control system 200 in a first or normal mode. As used with respect to flow control system 200, the term "normal mode" refers to a mode of operating wind turbine 10, flow control system 200, and/or air distribution system 202 such that flow control system 200 and/or air distribution system 202 generates synthetic jet 212 to modify lift on blade 22. The normal mode includes normal operation over a substantially entire power curve; operating when a wind speed is too low to generate power but wind turbine 10 is prepared to generate power; using constant and variable speed-ranges; operating within a peak shaver range; operating in an above rated condition; and/or performing a storm cut out. Flow characteristics of synthetic jet 212 during the normal mode are determined empirically and/or are predetermined to achieve optimal lift on blade 22 depending on ambient conditions, such as a wind speed and/or a wind direction, precipitation, and/or other atmospheric and/or environmental conditions. At least one flow characteristic of synthetic jet 212 may be adjusted and/or varied during the normal mode, based on changing ambient conditions and/or operating characteristics of wind turbine 10, to facilitate achieving optimal blade lift.

Flow control system 200 and/or air distribution system 202 is operated 302 in the normal mode according to a predetermined schedule and/or based on wind conditions. In one embodiment, feedback loops are used by control system 36 to control flow control system 200. For example, when wind speeds are high, operation 302 of flow control system 200 is substantially terminated because increased lift on blade 22 is not desired in such wind conditions. However, even when active flow control is terminated, enough fluid is discharged from aperture 208 to facilitate preventing insects and/or other debris from flying into air distribution system 202. Such termination of active flow control is considered to be part of the normal operating mode.

Further, flow control system 200 and/or air distribution system 202 is operated 302 in the normal mode until it is determined that flow control system 200 and/or air distribution system 202 is fouled or may become fouled. In one embodiment, control system 36 determines an extent and/or a possibility of fouling of flow control system 200 and/or air distribution system 202. Alternatively, an operator of wind turbine 10 determines the extent and/or the possibility of fouling of flow control system 200 and/or air distribution system 202. In the exemplary embodiment, when flow control system 200 and/or air distribution system 202 is fouled, or may become fouled, maintenance is performed on wind turbine 10 to facilitate reducing fouling of flow control system 200 and/or air distribution system 202.

More specifically, method 300 includes operating 304 flow control system 200 and/or air distribution system 202 in a second mode different than the normal mode for a time period and/or until fouling has been rectified to facilitate removing debris from flow control system 200 and/or air distribution system 202. As used herein with respect to flow control system 200, the term "second mode" refers to a mode of operating wind turbine 10, flow control system 200, and/or air distribution system 202 to achieve an outcome in addition to or different than optimal lift on blade 22. As used herein, the term "optimal lift" refers to lift that maximizes power production and reduces the cost of power production, such as a lift that is optimized to account for initial costs of wind turbine 10 and/or a lift that produces a maximized ratio of annual energy capture over initial cost; however, any suitable optimization scheme can be used to achieve optimal lift. It should be understood that wind turbine 10 can be operated in more than two modes. For example, wind turbine 10 can further be operated in an ordinary operation mode, a full flow capacity mode, a zero flow mode, and/or a cleaning mode.

In the exemplary embodiment, the second mode is a mode that is intentionally beneficial for performing a cleaning operation rather than performing an operation target, such as capturing energy. During the second mode, control system 36 controls flow control system 200 and/or air distribution system 202 to facilitate removing debris from flow control system 200 and/or air distribution system 202. The second mode includes at least one cleaning mode to facilitate removing debris from flow control system 200 and/or air distribution system 202.

In the exemplary embodiment, the time period for the second mode is determined according to a preventative maintenance schedule, a corrective maintenance schedule, a determination of an extent of fouling, a determination of a possibility of fouling, a manual trigger by an operator, and/or a determination of optimal conditions for performing a cleaning mode. In a particular embodiment, control system 36 is configured to determine that ambient and/or operational conditions, such as a low wind speed, a high wind speed, a time of day, a time of year, and/or any other suitable condition, are optimal to operate 304 flow control system 200 and/or air distribution system 202 in the second mode, for example, during a low-power generation time period. One or more cleaning modes described in more detail below may be used during the second mode.

In the exemplary embodiment, after operation 304 in the second mode, method 300 includes operating 306 flow control system 200 and/or air distribution system 202 in the normal mode. More specifically, after the maintenance, cleaning, and/or preventative process of the second mode is completed, control system 36 controls wind turbine 10, flow control system 200, and/or air distribution system 202 to operate 306 in the normal mode, as described above.

The second mode may include one or more of a plurality of cleaning modes, some of which are described in more detail below. It should be understood that the suitable cleaning modes may be additionally or alternatively incorporated into the second mode.

A first cleaning mode includes using available equipment within wind turbine 10 to facilitate removing debris from flow control system 100. More specifically, control system 36 controls at least one flow control device 104 to operate in the first cleaning mode. The first cleaning mode may also be referred to as a reversed air-flow direction mode. During the first cleaning mode, control system 36 alters 304A fluid flow 112 through flow control system 100 and/or air distribution system 102 to flow in a reverse direction 138 (shown in FIG. 2) that is opposite to a normal direction 140 of fluid flow 112 during the normal mode. In the exemplary embodiment, normal direction 140 discharges fluid flow 112 from flow control system 100 and/or air distribution system 102 through aperture 108, and reverse direction 138 draws in ambient air 128 through aperture 108. During the first cleaning mode, a velocity, a mass flow rate, and/or other flow characteristics of fluid flow 112 are substantially constant and substantially in reverse direction 138. Alternatively, a velocity, a mass flow rate, and/or other flow characteristics of fluid flow 112 are varied and substantially in reverse direction 138.

A second cleaning mode also includes using available equipment within wind turbine 10 to facilitate removing debris from flow control system 100. More specifically, control system 36 controls at least one flow control device 104 to operate in the second cleaning mode. The second cleaning mode may also be referred to as a pulse mode. During the second cleaning mode, control system 36 varies 304B flow characteristics of fluid flow 112 through flow control system 100 and/or air distribution system 102 during the time period. Specifically, in the exemplary embodiment, method 300 includes sequentially varying 304B at least one of a velocity, a flow rate, and a direction of fluid flow 112 through flow control system 100 and/or air distribution system 102 during the time period. In one embodiment, fluid flow 112 is alternatively varied 304B between normal direction 140 and reverse direction 138. In an alternative embodiment, the flow rate of fluid flow 112 is sequentially varied 304B. In a further alternative embodiment, the flow rate and the direction of fluid flow 112 is sequentially varied 304B. In the exemplary embodiment, the sequence of variation and/or the variable flow characteristics are determined empirically and/or are based on a configuration of wind turbine 10.

A third cleaning mode also includes using available equipment within wind turbine 10 to facilitate removing debris from flow control system 100. More specifically, control system 36 controls at least one flow control device 104 to operate in the third cleaning mode. The third cleaning mode may be referred to as an overload mode. During the third cleaning mode, control system 36 increases 304C at least a flow rate of fluid flow 112 through flow control system 100 and/or air distribution system 102 for the time period. Specifically, in the exemplary embodiment, flow control device 104 is operated at a temporary higher flow rate by temporarily increasing a capacity of flow control device 104. For example, the temporarily higher flow rate of fluid flow 112 is achieved by operating flow control device 104 at an overloaded capacity and/or in an overload condition. When flow control device 104 is operated at the overloaded capacity, the time period is also determined based on a length of time that flow control device 104 can operate at the overloaded capacity without overheating and/or otherwise experiencing a transient condition. When the third cleaning mode is combined with other cleaning modes described herein, the period of time can be selected to be longer than the length of time that flow control device 104 can operate at the overloaded capacity.

Any one or a combination of the first, second, and third cleaning modes may be used during the second mode to facilitate removing debris from flow control system 100 and/or air distribution system 102. Further, control system 36 is configured to select a cleaning mode based on measurements of flow control system 100 and/or air distribution system 102. Moreover, each cleaning mode may be used alternately after a period of normal mode operation. In one embodiment, all three cleaning modes are applied, in any suitable order, to facilitate removing debris from flow control system 100 and/or air distribution system 102. In an alternative embodiment, any two of the three cleaning modes, in any suitable order, are used as the second cleaning mode to facilitate removing debris from flow control system 100 and/or air distribution system 102.

A fourth cleaning mode also includes using available equipment within wind turbine 10 to facilitate removing debris from flow control system 200. More specifically, control system 36 controls at least one actuator 204 to operate in the fourth cleaning mode. The fourth cleaning mode may also be referred to as an alternative pulse pattern mode. During the fourth cleaning mode, control system 36 alters 304D a pulse pattern of at least one actuator 204. In the exemplary embodiment, as a preventative and/or corrective cleaning action, control system 36 alters 304D a normal pulse pattern performed by actuator 204 during the normal mode to an alternative pulse pattern that may have a different frequency of oscillation, amplitude of oscillation, a different breath-in and breath-out velocity, and/or any other suitable operating characteristic from the normal pulse pattern. Alteration 304D of the pulse pattern from the normal pulse pattern is, in the exemplary embodiment, performed according to a predetermined timing schedule and/or triggered manually by an operator of wind turbine 10.

A fifth cleaning mode also includes using available equipment within wind turbine 10 to facilitate removing debris from flow control system 200. More specifically, control system 36 controls at least one actuator 204 to operate in the fifth cleaning mode. The fifth cleaning mode may also be referred to as an asymmetric mode. During the fifth cleaning mode, control system 36 applies 304E an asymmetric flow pattern to at least one actuator 204. In contrast, a substantially symmetric flow pattern is applied during the normal mode. In the exemplary embodiment, the asymmetric flow pattern includes drawing air into actuator 204 at a first velocity and discharging air from actuator 204 at a second velocity that is higher than the first velocity. As such, air having debris therein is expelled from actuator 204 through aperture 208 with greater force than when air enters actuator 204 through aperture 208.

A sixth cleaning mode also includes using available equipment within wind turbine 10 to facilitate removing debris from flow control system 100 having gas accumulator 134. More specifically, control system 36 controls at least one flow control device 104 and at least one gas accumulator 134 to operate in the sixth cleaning mode. The sixth cleaning mode may also be referred to as a cleaning equipment mode. During the sixth cleaning mode, control system 36 controls flow control system 100 and/or air distribution system 102 to discharge 304F pressurized gas 136 into air distribution system 102 from gas accumulator 134. Specifically, in the exemplary embodiment, gas 136 under pressure is discharged 304F suddenly into air distribution system 102, in a manner similar to sneezing. Such discharge 304F of gas 136 at a temporarily higher air velocity facilitates loosening and/or removing debris from flow control system 100 and/or air distribution system 102. In the exemplary embodiment, pressurized gas 136 is discharged 304F into at least one assembly 110. In one embodiment, pressurized gas 136 is discharged 304F into at least one manifold 106. In an alternative embodiment, pressurized gas 136 is discharged 304F into at least one flow control device 104.

Any one or a combination of the six cleaning modes described herein may be used during the second mode to facilitate removing debris from flow control system 100 and/or 200 and/or air distribution system 102 and/or 202. In the exemplary embodiment, a cleaning mode is selected based on the type of equipment available in wind turbine 10, such as nonzero-net-mass-flow equipment and/or zero-net-mass-flow equipment. Further, control system 36 is configured to select a cleaning mode based on measurements of flow control system 100 and/or 200 and/or air distribution system 102 and/or 202. Moreover, each mode may be used alternately after a period of normal mode operation. In one embodiment, a plurality of cleaning modes is applied, in any suitable order, to facilitate removing debris from flow control system 100 and/or 200 and/or air distribution system 102 and/or 202. Additionally, when flow control system 100 and/or 200 includes a fluid distribution system, a cleaning agent can be channeled to air distribution system 102 and/or 202 during any of the above-described cleaning modes to facilitate removing debris from flow control system 100 and/or 200 and/or air distribution system 102 and/or 202.

Further, during the second mode, for example, at least one of the above-described cleaning modes, one or more operating characteristics of wind turbine 10, such as a speed, a power, and/or any other operating characteristic, may be tuned by control system 36 to accelerate the maintenance, cleaning, and/or preventative process. For example, a rotor speed may be maximized to obtain additional airflow due to centrifugal acceleration. In reverse flow, the rotor speed may be minimized to minimize hindrance of the airflow due to the centrifugal acceleration that is opposite to the direction of motion during reverse flow.

The above-described systems and methods facilitate correcting and/or preventing fouling of an airfoil and/or an active flow control (AFC) system used with the blade. As such, the embodiments described herein facilitate more wide-spread use of AFC in, for example, wind turbine applications. The above-described systems provide an automatic and/or remote controlled method of correcting and/or preventing fouling of an AFC system by using a control system located at least partially within a wind turbine to perform the methods described herein. As such, the AFC system is not required to be only cleaned and/or maintained manually at the wind turbine.

The above-described control system facilitates reducing human operator intervention when fouling has taken place and/or will take place. Further, the systems described herein allow for cleaning and/or maintenance of the AFC system and/or wind turbine during optimal operating conditions, such as low power-generating time periods, such that the wind turbine is not required to be taken offline to perform cleaning and/or maintenance. Additionally, by using equipment available within a wind turbine, or adding a minimal number of new components, the embodiments described herein facilitate minimizing expenditures on prevention/cleaning systems. By varying the mode of operation during the second mode, existing equipment can be re-purposed for prevention and/or correction of fouling of the flow control system.

A technical effect of the systems and method described herein includes at least one of: (a) operating a flow control system of the wind turbine in a first mode; (b) operating a flow control system in a second mode different than a first mode to facilitate removing debris from the flow control system, the second mode including varying at least one of a velocity, a flow rate, and a direction of a fluid flow of the flow control system; (c) altering a fluid flow through a flow control system to flow in a direction opposite to a first direction of the fluid flow during the first mode; (d) sequentially varying at least one of a velocity, a flow rate, and a direction of a fluid flow through the flow control system during a second mode; (e) increasing at least a flow rate of a fluid flow through the flow control system during the second mode; (f) altering a pulse pattern of the actuator; (g) applying an asymmetric flow pattern to the actuator; and (h) discharging a pressurized gas into the flow control system from a gas accumulator.

Exemplary embodiments of systems and methods for operating an active flow control system are described above in detail. The systems and methods are not limited to the specific embodiments described herein, but rather, components of the systems and/or steps of the methods may be utilized independently and separately from other components and/or steps described herein. For example, the methods may also be used in combination with other active flow control systems, and are not limited to practice with only the wind turbine systems as described herein. Rather, the exemplary embodiment can be implemented and utilized in connection with many other fouling prevention and/or correction applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method performed by a control system for operating a wind turbine, said method comprising:
   operating a flow control system of the wind turbine in a first mode;
   determining an extent of fouling of the flow control system; and,
   operating the flow control system in a second mode different than the first mode based on the determination, the second mode including varying at least one of a velocity, a flow rate, and a direction of a fluid flow of the flow control system to facilitate removing debris from the flow control system.

2. A method in accordance with claim 1, wherein operating the flow control system in a second mode further comprises altering the fluid flow through the flow control system to flow in a direction opposite to a direction of the fluid flow during the first mode.

3. A method in accordance with claim 1, wherein operating the flow control system in a second mode further comprises sequentially varying at least one of the velocity, the flow rate, and the direction of the fluid flow through the flow control system during the second mode.

4. A method in accordance with claim 1, wherein operating the flow control system in a second mode further comprises increasing at least the flow rate of the fluid flow through the flow control system during the second mode.

5. A method in accordance with claim 1, wherein the flow control system includes an actuator, and said operating the flow control system in a second mode further comprises altering a pulse pattern of the actuator.

6. A method in accordance with claim 1, wherein the flow control system includes an actuator, and said operating the flow control system in a second mode further comprises applying an asymmetric flow pattern to the actuator.

7. A method in accordance with claim 1, wherein the flow control system includes a gas accumulator, and said operating the flow control system in a second mode further comprises discharging a pressurized gas into the flow control system from the gas accumulator.

8. A flow control system for use with a wind turbine, said flow control system comprising:
   an air distribution system at least partially defined within at least one blade of the wind turbine, said air distribution system comprising at least one aperture defined through said at least one blade; and,
   a control system in operational control communication with said air distribution system, said control system configured to:
      operate said flow control system in a first mode;
      determine an extent of fouling of said flow control system; and,
      operate said flow control system in a second mode different than the first mode based on the determination, the second mode including varying at least one of a velocity, a flow rate, and a direction of a fluid flow of said flow control system to facilitate removing debris from said flow control system.

9. A flow control system in accordance with claim 8, wherein said air distribution system comprises:
   at least one manifold positioned at least partially within said blade and in flow communication with said aperture, in the first mode, fluid flow through said manifold is in a first direction; and,
   at least one flow control device in flow communication with said at least one manifold, said control system further configured to operate said air distribution system in the second mode by at least one of:
      altering the fluid flow through said manifold to flow in a reverse direction opposite to the first direction of the fluid flow during the first mode;
      sequentially varying at least one of the velocity, the flow rate, and the direction of the fluid flow during the second mode; and,
      increasing at least the flow rate of the fluid flow during the second mode by operating said flow control device at an overload condition.

10. A flow control system in accordance with claim 9, wherein said control system is configured to sequentially vary at least one of the velocity, the flow rate, and the direction of the fluid flow by controlling said flow control device to alter the fluid flow through said manifold to flow in the reverse direction.

11. A flow control system in accordance with claim 8, wherein said air distribution system comprises:
   at least one actuator positioned at least partially within said blade; and,
   a communication link extending between said actuator and said control system, said control system in operational control communication with said actuator, said control system further configured to operate said air distribution system in the second mode by at least one of:
      altering a pulse pattern of said actuator; and,
      applying an asymmetric flow pattern to said actuator.

12. A flow control system in accordance with claim 11, wherein said control system is configured to alter the pulse pattern by controlling said actuator to alter at least one of a frequency of oscillation, an amplitude of oscillation, a velocity of a breath-in stroke, and a velocity of a breath-out stroke of said actuator.

13. A flow control system in accordance with claim 11, wherein said control system is configured to apply the asymmetric flow pattern by controlling said actuator to draw air into said actuator at a first velocity and discharge air from said actuator at a second velocity greater than the first velocity.

14. A flow control system in accordance with claim 8, further comprising a gas accumulator, said control system further configured to discharge a pressurized gas into said air distribution system from said gas accumulator.

15. A wind turbine, comprising:
   a rotor;
   at least one blade coupled to said rotor, said blade having an outer surface;
   an air distribution system at least partially defined within said blade, said air distribution system comprising at least one aperture defined through said outer surface of said blade; and,
   a control system in operational control communication with said air distribution system, said control system configured to:
      operate said air distribution system of the wind turbine in a first mode;
      determine an extent of fouling of said air distribution system; and,
      operate said air distribution system in a second mode different than the first mode based on the determination, the second mode including varying at least one of a velocity, a flow rate, and a direction of a fluid flow of said air distribution system to facilitate removing debris from said air distribution system.

16. A wind turbine in accordance with claim 15, wherein said control system is further configured to:
- determine an optimal speed of said rotor to one of obtain additional airflow by centrifugal acceleration and minimize a hindrance resulting from the additional airflow; and,
- rotate said rotor at said optimal speed during the second mode.

17. A wind turbine in accordance with claim 15 wherein said control system is further configured to operate said air distribution system in the second mode by at least one of:
- altering the fluid flow through said air distribution system to flow in a reverse direction opposite to a first direction of the fluid flow during the first mode;
- sequentially varying at least one of the velocity, the flow rate, and the direction of the fluid flow during the second mode;
- increasing at least the flow rate of the fluid flow during the second mode;
- altering a pulse pattern of an actuator within said air distribution system;
- applying an asymmetric flow pattern to said actuator; and,
- discharging a pressurized gas into said air distribution system from a gas accumulator of said flow control system.

18. A wind turbine in accordance with claim 15, wherein said control system is further configured to operate said air distribution system in the second mode by performing, in any order, at least two of:
- altering the fluid flow through said air distribution system to flow in a reverse direction opposite to a first direction of the fluid flow during the first mode;
- sequentially varying at least one of the velocity, the flow rate, and the direction of the fluid flow during the second mode; and,
- increasing at least the flow rate of the fluid flow during the second mode.

19. A wind turbine in accordance with claim 15, wherein said air distribution system comprises:
- at least one manifold at least partially positioned within said blade and in flow communication with said aperture, in the first mode, the fluid flow through said manifold in a first direction; and,
- at least one flow control device in flow communication with said manifold, said control system further configured to operate said air distribution system in the second mode by at least one of:
  - altering the fluid flow through said manifold to flow in a reverse direction opposite to the first direction of the fluid flow during the first mode;
  - sequentially varying at least one of the velocity, the flow rate, and the direction of the fluid flow during the second mode; and,
  - increasing at least the flow rate of the fluid flow during the second mode by operating said flow control device at an overload condition.

20. A wind turbine in accordance with claim 15, wherein said air distribution system comprises:
- at least one actuator positioned at least partially within said blade; and,
- a communication link extending between said actuator and said control system, said control system in operational control communication with said actuator, said control system further configured to operate said air distribution system in the second mode by at least one of:
  - altering a pulse pattern of said actuator; and,
  - applying an asymmetric flow pattern to said actuator.

* * * * *